United States Patent Office 3,773,901
Patented Nov. 20, 1973

3,773,901
SYNTHESIS OF TRIFLUORAMINE OXIDE AND CHLORODIFLUORAMINE
Carl J. Schack and Donald Pilipovich, Woodland Hills, Calif., assignors to Rockwell International Corporation
No Drawing. Filed Apr. 1, 1968, Ser. No. 718,987
Int. Cl. C01b 21/20
U.S. Cl. 423—386  4 Claims

ABSTRACT OF THE DISCLOSURE

A new synthesis of chlorodifluoramine and trifluoramine oxide by the reaction of oxychlorinetrifluoride and difluoramine.

GOVERNMENT INTEREST

The invention herein described was made in the course of or under a contract with the Department of the Navy.

REFERENCES TO RELATED APPLICATIONS

This disclosure is related to U.S. Pat. No. 3,346,652; U.S. patent application Ser. No. 142,459, entitled, "Chemical Compound," by E. A. Lawton and D. Pilipovich; and U.S. patent application Ser. No. 543,493, entitled, "New Compound and Its Method of Preparation," by D. Pilipovich, et al.

BACKGROUND OF THE INVENTION

The compound $NF_3O$, revealed in copending U.S. application Ser. No. 142,459, filed Sept. 29, 1961, is a useful intermediate in the synthesis of many compounds. One such synthesis is the fluorination of halo-olefins, as revealed in U.S. Pat. No. 3,346,652.

PRIOR ART

Copending U.S. application Ser. No. 543,493 reveals a new composition of matter, oxychlorinetrifluoride, $OClF_3$. In that application, the production of oxychlorinetrifluoride by the low temperature reaction of fluorine with $Cl_2O$ according to the following reaction:

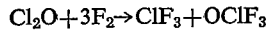

is revealed. The synthesis for trifluoramine oxide disclosed in U.S. Pat. No. 3,346,652 and U.S. application Ser. No. 142,459 has the disadvantage of giving relatively low yields. Other syntheses require excessive pressures, highly corrosive conditions, and quenching.

It is an object of this invention to provide a new and improved process for the synthesis of trifluoramine oxide.

It is a further object of this invention to provide a new process for the synthesis of chlorodifluoramine.

Other and further objects of the invention will become apparent from the following detailed description.

SUMMARY OF THE INVENTION

The objects of this invention are achieved by reacting oxychlorinetrifluoride and difluoramine at moderately low temperatures.

While not wishing to be bound by theory, it is believed that the reaction follows the course:

$$ClF_3O + 2HNF_2 \rightarrow NF_3O + ClNF_2 + 2HF$$

Due to the high reactivity of the starting materials, it is preferred that the reaction be conducted at low temperature and autogenic pressures, although the reaction will take place instantaneously at ambient temperatures and pressures. The yield of these reactions at ambient temperatures and pressures, however, is distinctly lower than the yields of the same reaction at lower temperatures and pressures. Reaction of stoichiometric quantities is preferred, although an excess of either starting reactant is operable.

The preferred mode of reaction is to condense one of the reactants into a cold evacuated reactor, then the other into the same reactor. Upon removal of the cooling means from the container, the liquefaction of the lower melting reactant, i.e., $HNF_2$, is quickly followed by a reaction. At normal pressures, the $HNF_2$ melts at about $-116°$ C., while the $ClF_3O$ melts at about $-37°$ C. Of course, the reaction proceeds as both reactants become liquid and on into the gaseous stage should the warming of the reaction mixture be of a sufficient speed to reach a gaseous stage prior to completion of the reaction.

It should be noted that dry fluorocarbon reaction vessels are most suitable for carrying out the reaction of the instant invention as the $ClF_3O$ and one of the by-products of the reaction, HF, are highly reactive with glass. Additionally, $HNF_2$ is highly reactive with most metals. After the reaction, the by-products may be separated by conventional means, i.e., fractional condensation from the desired $NF_3O$ or $ClNF_2$.

EXAMPLE I 30 cc. of $ClF_3O$ was condensed in a trap at $-196°$ C. 29 cc. of $HNF_2$ was then condensed in the same trap at $-142°$ C. The reaction was then allowed to proceed prior to fractionation. All the $HNF_2$ was converted to approximately a 2:2:1 mixture of $NF_3O$, $ClNF_2$ and $N_2F_4$.

EXAMPLE II

A constant temperature reaction was conducted at $-112°$ C. with 27.5 cc. $ClF_3O$ and 36.5 cc. of $HNF_2$. Only 75 percent of the total NF product mixture was removed after 15 minutes pumping at that temperature. The remaining 25 percent was obtained on warming the reator. The product contained $NF_3O$ and $ClNF_2$.

EXAMPLE III

A gas phase reaction between $ClF_3O$ and $HNF_2$ was conducted at ambient temperature and pressure. Instantaneous reaction resulted, giving a poor yield of $NF_3O$ and $ClNF_2$.

Since it is obvious that many changes and modifications can be made in the above described details without departing from the nature and spirit of the invention, it is to be understood that the invention is not to be limited thereto except as set forth in the appended claims.

We claim:
1. The process of preparation of reactive NF compounds which comprises: reacting $ClF_3O$ and $HNF_2$, thereby producing a product mixture comprising $NF_3O$, and separating said $NF_3O$.
2. The reaction of claim 1 wherein the reaction takes place at temperatures of between $-116°$ C. and $-37°$ C.
3. The process of claim 1 wherein the $NF_3O$ is separated by fractional condensation.
4. The process of claim 1 wherein the product mixture comprises $ClNF_2$, and including the additional step of separating said $ClNF_2$.

References Cited
UNITED STATES PATENTS

| | | | |
|---|---|---|---|
| 3,392,099 | 7/1968 | Fox et al. | 23—203 |
| 3,341,292 | 9/1967 | Maxwell et al. | 23—203 |
| 3,314,770 | 4/1967 | Knipe et al. | 23—356 |
| 3,101,997 | 8/1963 | Freeman et al. | 23—356 |

CARL D. QUARFORTH, Primary Examiner

R. L. TATE, Assistant Examiner

U.S. Cl. X.R.